Patented Sept. 3, 1940

2,213,693

UNITED STATES PATENT OFFICE 2,213,693

PIGMENT PREPARATION

John Stanley Herbert Davies, Anthony James Hailwood, and William Todd, Blackley, Manchester, England, assignors to Imperial Chemical Industries Limited, a corporation of Great Britain No Drawing. Application August 17, 1936, Serial No. 96,526

9 Claims. (Cl. 134—58)

The present invention relates to the manufacture of improved pigment preparations from the class of coloured substances known as the phthalocyanines.

The term phthalocyanine is a generic term for a group of chemical compounds of which the typical member is (metal-free) phthalocyanine itself, of the formula $(C_8H_4N_2)_4.H_2$ wherein the representation of two atoms of hydrogen separately is so made because thereby is indicated that those two atoms of hydrogen behave differently from the others, and in fact, are replaceable by metal atoms. (See for a detailed account of the chemistry of certain phthalocyanines Linstead et al., Journal of the Chemical Society, 1934, 1016–1039).

The manufacture of phthalocyanines is the subject of a number of patent specifications; for convenience British patent specifications Nos. 322169, 389842, 390149, 410814, 418367, and 441332 may be referred to.

When obtained as a result of the series of chemical reactions involved in their preparation these substances are often crystalline, and the crystals are characteristically very hard and may not be uniform in size. The substances are accordingly not suitable for use as pigments without further treatment, whereby inter alia the particle size may be made small and uniform. This is so, even when the phthalocyanines are finally purified, or freed from replaceable metal, by dissolving them in concentrated sulphuric acid and pouring the solution into water, as is described for instance in British specification No. 389842 wherein it is said that a substantially metal-free compound is obtained from the magnesium containing compound by grinding it with cold 96% sulphuric acid, filtering the solution through sintered glass or other medium suitable for use in filtering concentrated sulphuric acid and carefully diluting the solution by mixing it with ice, whereupon a blue precipitate is obtained which is washed free from acid and dried. Similarly, in British specification No. 410814 it is described how copper phthalocyanine is dissolved in cold sulphuric acid and reprecipitated on dilution with water, and how metal-free phthalocyanine is precipitated when a solution made by dissolving what is at least in part sodium phthalocyanine in concentrated sulphuric acid is poured into water.

An object of the present invention is to overcome the technical disadvantages of the prior art procedure referred to, and so to produce pigment preparations adapted for use, in that smooth textured powder and paste preparations are made. A further object is to prepare pigment preparations with the pigment particles of uniform particle size, and that size such that the colour value of the pigment is at a maximum, be the pigment used as such or after dilution by incorporation with white substrata.

These aims are achieved by the following invention wherein phthalocyanines are milled with an aqueous solution of a suitable dispersing agent, and the resulting paste either preserved for use or dried to give a soft uniform easily redispersible pigment powder.

The invention will be described in detail by reference to the following illustrative examples, wherein the parts are by weight.

*Example 1*

One part of phthalocyanine $(C_8H_4N_2)_4H_2$ is dissolved in a solution of 10 parts of concentrated sulphuric acid containing 0.5 part of the sodium salt of the formaldehyde condensation product from naphthalene sulphonic acid. The solution obtained is poured into 200 parts of a 0.125% aqueous solution of the same sodium salt of sulpho-naphthalene-formaldehyde condensation product. The precipitate is filtered off and washed free from acid by use of fresh portions of the same aqueous solution. The filter paste so obtained is transferred to a mechanical mortar, 0.05 part of the same sodium salt of sulpho-naphthalene-formaldehyde condensation product and a little ammonia are added (in case the washing had not been thorough enough) and the creamy paste is milled until the particle size is uniform as seen by microscopic examination of samples. The majority of the particles then have linear dimensions of about 0.3 micron.

The so-obtained paste is an excellent pigment paste, suitable for use where aqueous pigment pastes are applicable, e. g. in paper surfacing.

The milling is conveniently done in a rotating ball mill, using porcelain balls or quartzite pebbles. Alternatively a mechanically driven pestle and mortar may be used.

*Example 2*

8 parts of tin phthalocyanine (see British specification No. 410814 Example 5, i. e. made by interaction of phthalonitrile and stannous chloride) are dissolved in 80 parts of concentrated sulphuric acid. The solution is then poured slowly with stirring into 250 parts of a cold aqueous 0.25% solution of sulpho-naphthalene-formaldehyde condensation product sodium salt.

The finely divided precipitate is filtered off, washed free from acid and pressed. The presscake (which weighs about 50 parts) is mixed with water (about 25 parts) containing sulphonaphthalene-formaldehyde condensation product sodium salt, and milled in a rotary vessel containing quartzite gravel until the particles are uniformly small as described in Example 1. A pigment paste is obtained which resembles that of Example 1 but which is greener in shade.

*Example 3*

10 parts of copper phthalocyanine are dissolved in 100 parts of concentrated sulphuric acid as described in Example 1. The solution is poured into 1,000 parts of an aqueous 0.25% solution of sulphonaphthalene-formaldehyde condensation product sodium salt with stirring. The precipitate is filtered off, washed acid-free with an aqueous solution of the dispersing agent. The paste is transferred to a ball mill and ground until the particles are uniform in size and of linear dimensions between 0.3 micron and 0.5 micron.

The pigment is then eminently suitable for use.

*Example 4*

5 parts of aluminium phthalocyanine (see British specification No. 410814, Example 5, i. e. the product of the interaction of phthalonitrile and aluminium chloride) are dissolved in 140 parts of concentrated sulphuric acid and the solution is treated exactly as the corresponding solution in Example 3 above. A green pigment paste is obtained.

In place of sulphonaphthalene formaldehyde condensation product sodium salt (for which see British specification No. 7137/1913) in the aqueous solution used for milling the substance there may be used sulphate cellulose pitch, or the substance obtained by treating sulphite cellulose pitch with ammonia as described in U. S. Patent No. 1,812,693.

The products of any of the above examples may be dried in any suitable way to give powders in which the pigment is associated with a small amount of dispersing agent. It will be understood that dispersing agents which are themselves hygroscopic or liquid cannot conveniently be used and hence it is preferred to use the substances hereinbefore mentioned.

We claim:

1. A composition of matter comprising a colouring matter of the phthalocyanine series and a water-soluble salt of the condensation product of naphthalene-sulfonic acid and formaldehyde.

2. A composition of matter comprising a metal phthalocyanine and a dispersing agent which is a water-soluble salt of sulfo-naphthalene-formaldehyde condensation product.

3. A composition of matter comprising copper-phthalocyanine and the sodium salt of naphthalene-sulfonic acid-formaldehyde condensation product.

4. A composition of matter comprising metal-free phthalocyanine and the sodium salt of naphthalene - sulfonic - acid - formaldehyde condensation product.

5. A process for improving the physical qualities of a pigment of the phthalocyanine series, which comprises precipitating the same from sulfuric acid solution in the presence of a water-soluble, non-hygroscopic dispersing agent.

6. The process of producing a phthalocyanine pigment having improved dispersibility as compared to the untreated pigment, which comprises forming a solution of said pigment in concentrated sulfuric acid, and pouring the latter into a mass of water containing a water-soluble, non-hygroscopic dispersing agent, to precipitate the pigment in the presence of said dispersing agent.

7. The process of producing a phthalocyanine pigment having improved dispersibility as compared to the untreated pigment, which comprises forming a solution of said pigment in concentrated sulfuric acid, pouring the latter into a mass of water containing a water-soluble, non-hygroscopic dispersing agent, to precipitate the pigment in the presence of said dispersing agent, recovering said precipitate and milling the same in the presence of further quantities of said dispersing agent until the desired degree of fineness has been attained.

8. A process of improving the physical qualities of a phthalocyanine pigment, which comprises forming a solution of said pigment in concentrated sulfuric acid and precipitating the pigment from said solution by diluting the same with water containing the sodium salt of sulfo-naphthalene-formaldehyde condensation product.

9. A process as in claim 8, followed by the step of milling said precipitated pigment in the presence of water containing the same sodium salt, the added quantity of water being sufficient to maintain the pigment in pasty condition during the milling operation.

JOHN STANLEY HERBERT DAVIES.
ANTHONY JAMES HAILWOOD.
WILLIAM TODD.